US009353794B2

(12) United States Patent
Pabst et al.

(10) Patent No.: US 9,353,794 B2
(45) Date of Patent: May 31, 2016

(54) CONVERTER COLLAR BEARING FOR A TORQUE CONVERTER

(71) Applicant: Schaeffler Technologies GmbH & Co. KG, Herzogenaurach (DE)

(72) Inventors: Alexander Pabst, Erlangen (DE); Frank Beeck, Eckental (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/487,469

(22) Filed: Sep. 16, 2014

(65) Prior Publication Data

US 2015/0055908 A1 Feb. 26, 2015

Related U.S. Application Data

(63) Continuation of application No. PCT/EP2013/058419, filed on Apr. 24, 2013.

(30) Foreign Application Priority Data

Apr. 27, 2012 (DE) .......................... 10 2012 207 074
Dec. 5, 2012 (DE) .......................... 10 2012 222 279

(51) Int. Cl.
*F16C 19/26* (2006.01)
*F16C 33/64* (2006.01)
(Continued)

(52) U.S. Cl.
CPC ............... *F16C 33/588* (2013.01); *F16C 19/26* (2013.01); *F16C 19/466* (2013.01); *F16C 27/04* (2013.01);
(Continued)

(58) Field of Classification Search
CPC .... F16C 19/466; F16C 33/583; F16C 33/581; F16C 33/588; F16C 33/64; F16C 33/67; F16C 2360/00; F16C 33/585; F16C 43/065; F16C 19/26; Y10T 29/49668; F16H 41/04
USPC ................. 384/548, 569, 581, 586, 564–565; 29/898.064; 60/361; 415/406
See application file for complete search history.

(56) References Cited

U.S. PATENT DOCUMENTS 3,307,891 A * 3/1967 Carullo .......................... 384/569
3,719,979 A * 3/1973 Irwin .......................... 29/898.03
(Continued)

FOREIGN PATENT DOCUMENTS

DE 4133187 A1 4/1992
DE 4134369 A1 4/1992
(Continued)

*Primary Examiner* — Marcus Charles
(74) *Attorney, Agent, or Firm* — Simpson & Simpson, PLLC

(57) ABSTRACT

A bearing position for a torque converter, wherein a pump impeller is connected to a converter neck, and the pump impeller is rotatably mounted on the bearing position by at least one roller bearing in a housing, wherein the roller bearing comprises an outer rolling raceway, assigned to the converter neck and facing radially outwards, and an inner rolling raceway, assigned to the housing and facing radially inwards, and rollers disposed radially between the rolling raceways, wherein the bearing position comprises at least one radially elastically designed section of a sleeve of the roller bearing, where the sleeve is provided with the inner rolling raceway, wherein the section, enclosing an elastic convex raceway curvature, is resiliently prestressed in the radial direction against at least a first roller of the rollers, the first roller supported on the outer rolling raceway, and supported in the opposite radial direction on the housing.

11 Claims, 4 Drawing Sheets

(51) Int. Cl.
 *F16C 19/46* (2006.01)
 *F16C 33/58* (2006.01)
 *F16C 27/04* (2006.01)
 *F16C 43/06* (2006.01)

(52) U.S. Cl.
 CPC .............. *F16C 33/585* (2013.01); *F16C 33/64* (2013.01); *F16C 43/065* (2013.01); *F16C 2360/00* (2013.01); *Y10T 29/49686* (2015.01)

(56) References Cited

U.S. PATENT DOCUMENTS

| | | | | |
|---|---|---|---|---|
| 3,876,265 | A | * | 4/1975 | McCloskey .................. 384/43 |
| 4,294,100 | A | * | 10/1981 | Olschewski et al. .......... 72/340 |
| 4,783,960 | A | * | 11/1988 | Kubo et al. ................... 60/338 |
| 4,934,206 | A | * | 6/1990 | Nakano ......................... 476/42 |
| 5,352,100 | A | * | 10/1994 | Bauknecht et al. ........... 417/405 |
| 5,567,060 | A | * | 10/1996 | Steinberger et al. .......... 384/569 |
| 6,109,791 | A | * | 8/2000 | Metton et al. ................. 384/581 |
| 2002/0110301 | A1 | * | 8/2002 | Niina ........................... 384/569 |

FOREIGN PATENT DOCUMENTS

| | | | | |
|---|---|---|---|---|
| DE | 4204981 | A1 | | 8/1993 |
| DE | 4332088 | A1 * | 3/1995 | ............ B60K 17/04 |
| DE | 4440313 | A1 | | 8/1995 |
| DE | 19513668 | A1 | | 10/1996 |
| DE | 19781320 | B4 | | 3/2006 |
| FR | 2789458 | A1 | | 8/2000 |
| JP | 09317757 | A * | 12/1997 | ............ F16C 19/44 |

\* cited by examiner

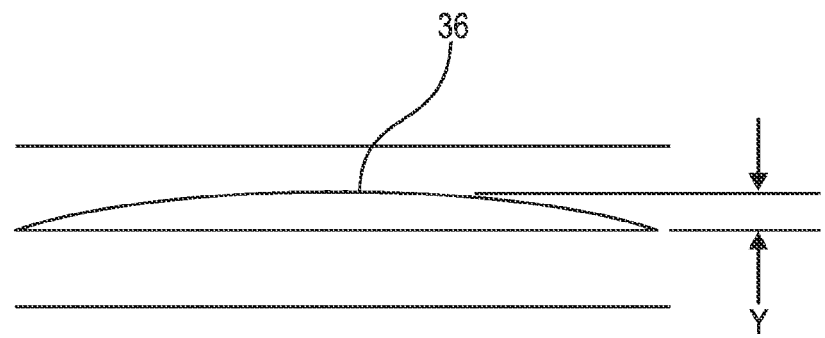
Fig. 6
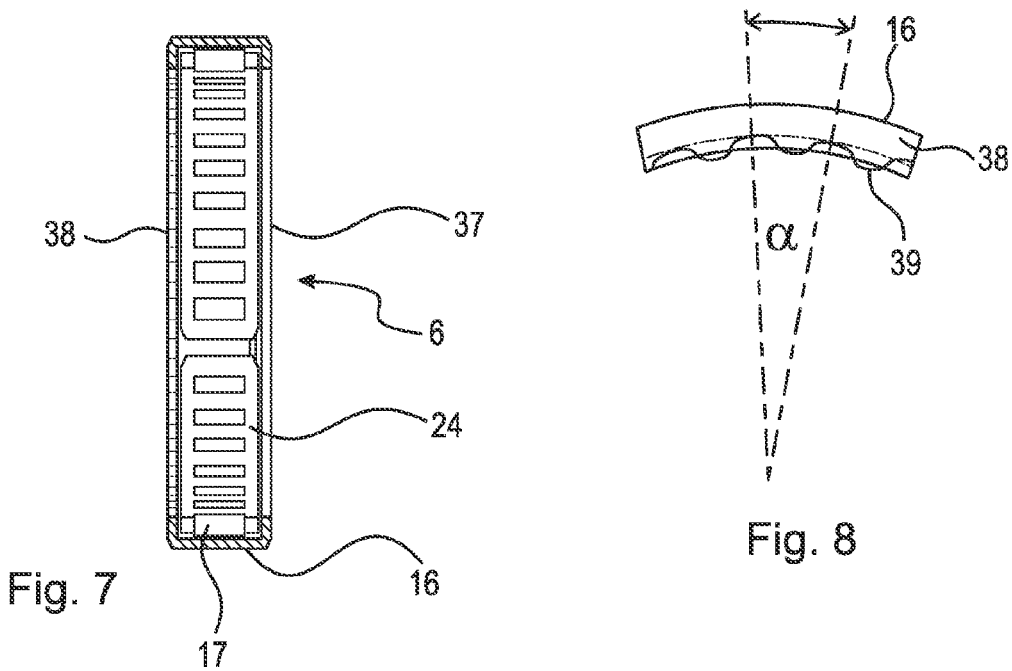
Fig. 7
Fig. 8

CONVERTER COLLAR BEARING FOR A TORQUE CONVERTER

CROSS-REFERENCE TO RELATED APPLICATIONS

This patent application is filed under 35 U.S.C. §111(a), 35 U.S.C. §120 and 35 U.S.C. §365(c) as a continuation of PCT Patent Application PCT/EP2013/058419, filed Apr. 24, 2013, and claims priority thereto, and claims priority to German Patent Application DE 102012207074.5, filed Apr. 27, 2012, and German Patent Application DE 102012222279.0, filed Dec. 5, 2012, which applications are hereby incorporated by reference in their entireties.

FIELD OF THE INVENTION

The invention relates to a bearing position for rotatably mounting a pump impeller of a torque converter in a housing, wherein the pump impeller is connected to a converter neck, by way of which the pump impeller is rotatably mounted on the bearing position by means of at least one roller bearing in the housing, wherein the rolling bearing comprises an outer rolling raceway, which is assigned to the converter neck and which faces radially outwards, and an inner rolling raceway, which is assigned to the housing and which faces radially inwards, and rollers, which are disposed radially between the rolling raceways. Furthermore, the invention relates to a roller bearing for such a bearing position, a roller bearing in such a bearing position and a transmission with a torque converter, in which a pump impeller, which is connected to a converter neck and which is a part of the torque converter, is rotatably mounted on such a bearing position by means of the converter neck.

BACKGROUND OF THE INVENTION

DE 41 34 369 A1 shows such an arrangement of a hydrodynamic torque converter, which is connected to a transmission and is intended for a motor vehicle. In this case the input shaft of the transmission is connected in a rotationally rigid manner to the turbine impeller of the torque converter. A cylindrical extension from the pump impeller of the torque converter forms the converter neck. The pump impeller can be connected, as required, to a primary pump, by means of which the transmission is supplied with hydraulic fluid and the torque converter is supplied with oil. The pump impeller is rotatably mounted on a housing by means of the converter neck at a bearing position by way of a rolling bearing that is designed as a roller bearing. Owing to the axial offset or the tilting of the axes of rotation in the arrangement, the bearing positions, or, more specifically, the rolling bearings, are loaded disadvantageously, in particular unevenly, a situation that is associated with an adverse generation of noise.

FR 2789458 A1 discloses a rolling bearing that is designed as a roller bearing for the purpose of mounting a steering column. As a measure to compensate for a bearing clearance in the installed state, the roller bearing comprises an outer bearing ring, which is circumferentially defined by end sections on both sides. These end sections are connected locally to a central circumferential section by means of tabs. The section that forms a raceway for the rolling elements on the internal face is guided on the opposite side on the shaft or rather the steering column. Furthermore, in order to have an impact on the bearing clearance, the central circumferential section has a curved rolling element raceway, which tapers off in the region of the tabs, so that the rolling elements are elastically prestressed in the installed state of the roller bearing. The object of the present invention is to provide a concept, with which the bearing clearance of a rolling bearing for mounting a converter neck of a torque converter can be eliminated as much as possible.

BRIEF SUMMARY OF THE INVENTION

According to the invention, the bearing position comprises at least one section of a sleeve of the roller bearing, wherein said sleeve section is designed to be elastic in the radial direction, and wherein the sleeve is provided with the inner rolling raceway. With the exception of the elastic section(s), the sleeve is a hollow cylindrical component in its contour. The wall thickness of this sleeve is small compared to its diameter. The ratio of the inner diameter of the regions of the inner rolling raceway that are described by a radius to the radial wall thickness of the sleeve is preferably ≥(equal to or greater than) the value 10. The material of the sleeve is preferably sheet steel. The section has a geometry, which deviates from the cylindrical shape, at least on the inner raceway and forms at the same time a convex raceway curvature for the rolling elements that are designed as rollers. The section is prestressed in an elastic manner by means of the convex raceway curvature in the radial direction against at least one roller of a row of roller bearings, preferably, however, against two, three or even more of the rollers. Due to the fact that the section of the sleeve is prestressed radially against the roller(s), these rollers are supported radially inwards in the direction of the axis of rotation on the outer rolling raceway. The net result of this arrangement is that the roller bearing is prestressed at least in those regions, so that the roller bearing exhibits at a minimum zero clearance or rather as near zero clearance as possible. In this case the sleeve section is prestressed in an elastic manner against the rollers; and, as a result, the converter neck is mounted in such a way that it is elastically prestressed relative to the housing.

Radial bearings typically exhibit radial clearances due to the production and assembly process. The roller bearing is a radial bearing, in which essentially only radial forces are supported. Owing to the manufacturing tolerances and for reasons relating to ease of assembly, the radial bearings always exhibit, as a rule, radial clearances. In this case the bearing clearances occur in the ring gap between the rollers or more specifically between the rolling elements and their associated rolling raceways. The radial distance between the opposing rolling raceways is the sum of the diameter of the rollers and the radial clearance. Within this clearance the rollers can move radially between the rolling raceways. As a result, the rolling raceways can move relative to each other within this clearance, a feature that can result in a disadvantageous generation of noise.

Furthermore, it is possible for the bearing positions of the rolling bearings for mounting the converter neck to become disadvantageous due to an axial offset, a radial runout, a tilting or secondary axis errors of the axes of rotation. These drawbacks may cause the rotating components to wobble or tumble, which in turn will result in disadvantageous, in particular uneven loads on the bearing positions or more specifically on the rolling bearings as well as a disadvantageous generation of noise. The term "axial offset" or "displacement" is defined as the slope of the axis of rotation in relation to the ideal orientation; and the term "radial runout" is defined as the deviation from the axially parallel ideal position of the axes of rotation or the axes of symmetry of the components that communicate with each other, such as the axis of rotation of the converter neck to the axis of symmetry of the housing bore at the bearing seat.

The advantage of the arrangement according to the invention lies in the fact that an axial offset and a radial runout caused, for example, by the production process are elastically absorbed and cushioned at the bearing position by means of the subsections of the inner rolling raceway that are elastically prestressed against the rollers at the section.

When the converter neck rotates relative to the housing, the rolling elements of the roller bearing roll on the rolling raceways and, in so doing, pass in succession the elastic first sections, which form the bottlenecks and which eliminate the bearing clearance. These elastic first sections protrude, compared to the second sections, further in the direction of the outer raceway of the rolling elements.

Preferably the roller bearing comprises at least three first sections of the sleeve, wherein these first sections are uniformly distributed over the periphery and reduce the radial distance between the paths of the rolling elements. Each of these first sections comprises a transversely convex raceway curvature exhibiting a defined deviation from roundness. Owing to the convex raceway curvature of the sections, it is possible to realize a roller bearing with zero clearance or with as near zero clearance as possible. In this respect the individual sections of the sleeve compress in the desired elastic manner under a radial load. Furthermore, it is advantageous that in view of the elasticity, the compression can be adapted to the resulting radial load by means of the structural design or more specifically the shape of the sections, which are constructed in the manner of a polygon, in connection with the convex raceway curvature. A noise-optimized roller bearing can be realized in an advantageous way by means of the inventive roller bearing, wherein the elasticity of the sleeve completely or rather nearly eliminates the clearance.

Roller bearings are rolling bearings with rollers as the rolling elements. These rolling bearings have an inner raceway and an outer raceway, between which one row or a plurality of axially adjacent rows of rolling elements is or are arranged in succession about an axis of rotation in the circumferential direction. The raceways are formed, by choice, on the surface of bearing rings. That is, the inner raceways are formed internally on the surface of outer rings, and the outer raceways are formed externally on the surface of inner rings or directly on sections on the surface of the components to be mounted. In this case the outer raceway of the rolling elements is formed either directly on the surface section of the converter neck or on an inner ring. The inner raceway is formed either in a housing, for example, in a housing of a primary pump or in an outer ring, which sits in the housing.

For the roller bearing it is possible to use rollers, such as needles or cylindrical rollers, as the rolling elements. In their basic form the rollers are designed externally cylindrical in shape and are provided with two end faces. As an alternative, it is possible to use rollers with a slightly convex shell that deviates from the outer cylindrical shape. The end faces are preferably planar or more specifically flat, or they are curved convexly or concavely. Needles are roller-like rolling elements having a ratio of their length to the nominal diameter of the shell that is equivalent to ≥the numerical value of 3. Cylindrical rollers have a much smaller ratio. According to an additional embodiment of the invention, the roller bearing comprises a cage that guides and/or fixes the rollers or more specifically the rolling elements in the circumferential direction and/or axially adjacent to each other. In order to receive or fix in a positive locking manner, the cage comprises holding elements, which do not affect the rotation of the rollers.

A preferred embodiment of the invention provides that the elastic first section of the inner rolling raceway of the sleeve of the roller bearing comprises a convex raceway curvature that exhibits a transverse convexity. The convex raceway curvature, which is oriented in the direction of the axis of rotation of the roller bearing, improves the elasticity of the first section of the inner rolling raceway of the sleeve in an advantageous way. In order to increase the size of a contact area between the sleeve and the rollers or more specifically the rolling elements, a central flattened zone in the region of a peak or rather the turning point of the convex raceway curvature forms an advantageous and enlarged contact zone that interacts with the rollers. As an additional measure to control the elasticity of the roller bearing, it is advisable to provide different wall thicknesses for the first sections of the inner rolling raceway of the sleeve, wherein these first sections enclose a convex raceway curvature.

According to the invention, the convex raceway curvature can also be structurally designed in such a way that in the installed state of the roller bearing in the bearing position, defined measuring ranges are provided for both a raceway linearity and a deviation from roundness. In the installed, pressed-in state an amount ≥0.01 mm is provided for the raceway linearity. In the region of the greatest diameter, the hill, a measuring range between 0.01 and 0.02 mm is preferred; and for the region with the smallest diameter, the valley, an amount ≥0.02 to 0.05 min is provided. In order to implement these measuring ranges, a tolerance range of the raceway linearity of 0.015 to 0.05 mm is determined for the production of the sleeve. As the deviation from roundness, an amount ≥0.02 mm is provided for the installed or more specifically the pressed-in sleeve of the roller bearing. An upper limit for the deviation from roundness is 0.04 mm. Correspondingly the result is a tolerance range of 0.2 to 0.35 mm that is provided for the deviation from roundness following completion of the sleeve in the non-installed, loose state.

An additional embodiment of the invention provides that the inner rolling raceway of the roller bearing, comprises, when viewed in the cross sections at right angles to the axis of rotation of the converter neck, at least two or three of the first regions. The radial amount, by which the section of the inner rolling raceway at the elastic region protrudes radially further in the direction of the axis of rotation of the roller bearing than the rest of the regions, is equivalent to at least the maximum radial clearance that is bridged by the prestressed first section or is approximately as large as this clearance. The amounts, by which the at least two, better three, of the sections or the first regions protrude further, are equivalent to at least half of the radial clearance or are greater than this clearance.

Usually the rolling elements of a roller bearing roll in a hollow cylindrical ring gap between the rolling raceways on the inner and outer rolling raceway. The radial distance between the inner raceway and the outer raceway corresponds radially to the diameter of the rollers, plus the radial clearance. The basic principle of zero clearance for the bearing of the converter neck consists of the fact that the inner rolling raceway, which is designed internally cylindrical in shape and which is usually described by a radius, protrudes at the elastic sections of the sleeve radially in the direction of the rolling raceway, which is designed externally cylindrical in shape, in the direction of the axis of rotation. Hence, at these sections the shape of the rolling raceway deviates from the cylindrical shape, so that at these sections bottlenecks are formed in the hollow cylindrical ring gap. Then the amount at the bottlenecks corresponds at most to the smallest possible diameter of the rollers or is even smaller. In this case the respective elastic section can be arched in the direction of the axis of rotation or can be flattened so as to be tangentially aligned. As an alternative, the first and second regions exhibit geometries that deviate from the circular cylindrical shape, so that the sleeve is designed, when viewed in the cross sections, for example, triangular or polygonal in shape. When the roller bearing is rotated, the rollers roll on the rolling raceways and pass one after the other the bottleneck(s). When the rollers are standing still, at least one of the rollers remains clamped between the two rolling raceways at the narrow point. As a result, the prestress is guaranteed, and rattling noises are avoided in any operating state of the bearing position for mounting a pump impeller in the roller bearing.

Preferably sheet steel is provided as the material for the sleeve of the roller bearing. The sleeve is supported, at least section by section, either radially in the bore of the housing or in a bearing outer ring with or without radial prestress. However, the first section with the first region of the rolling raceway is freely set apart radially in the direction of the housing or the outer ring. The distance between the outer ring or the housing is at least as large, as the elastic region, which deviates from the circular cylindrical shape of the raceway, protrudes radially in the direction of the axis of rotation. This arrangement allows the elastic sections to deflect within the allowable dimensional deviations or rather tolerances, which are adapted to the modifications that are made in the actual radial dimensions as a function of the production lot. In addition, in the case of a radial runout and also in the event that the rotating converter neck tilts, the rolling raceways deflect at the first regions in an adaptive manner without having to dispense with the zero clearance. Moreover, vibrations are damped in the bearing.

A roller bearing, which is designed according to the invention, is preferably intended for a bearing position that includes a roller bearing and by means of which a pump impeller is mounted. Furthermore, the inventive concept can be used for a transmission with a torque converter, in which a pump impeller, which is a part of the torque converter and which is connected to a converter neck, is rotatably mounted on or in a housing by means of the converter neck at a bearing position with a roller bearing according to the invention.

The invention also includes a method comprising the following steps is provided for manufacturing a roller bearing for a bearing position. First, a sleeve with a solid edge is manufactured by forming a sheet metal strip by means of a drawing process. The next step is to flange the sleeve and to provide the flanged edge with a perforation. The perforation, which is carried out preferably as a profiling in the shape of a crown, is located on the radially inwards facing side of at least one edge. This perforation is used for identification and, thus, to protect against a faulty assembly. In addition, when the assembly is automated, the perforation can be used to receive in a positive locking manner. The insertion of the sleeve into a die for forming a polygonal shape is provided as the next step. The tool, the die, is designed in such a way that after the forming process the sleeve exhibits both a defined deviation from roundness and a convex raceway curvature in the polygon-shaped sections. This step is followed by a heat treatment of the sleeve, wherein the heat treatment improves the resistance to wear. Then the roller bearing is completed, in that components, such as a cage and the rollers or more specifically the rolling elements, are inserted into the sleeve. In order to form a bearing position, the roller bearing is pressed into and positioned in a receiving bore of a housing. Finally the converter neck is inserted into and fixed in the bearing position.

BRIEF DESCRIPTION OF THE DRAWINGS

Additional features of the invention will be apparent from the following description of the figures, which show exemplary embodiments of the invention. In this case the invention is not limited to these exemplary embodiments, wherein:

FIG. 6 is a plot of a data recorder for measuring the linearity of the sleeve of a roller bearing;

FIG. 7 illustrates a cross sectional view of the roller bearing of the bearing position; and, FIG. 8 is a view of a detail of the roller bearing, according to FIG. 7.

DETAILED DESCRIPTION OF THE INVENTION

Figure 1:
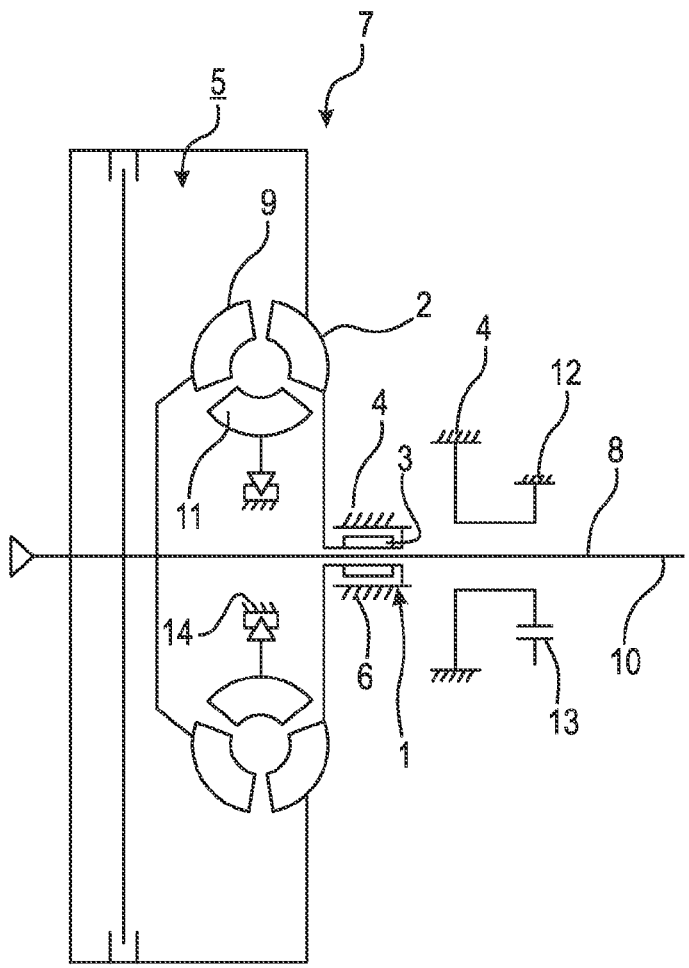
FIG. 1 illustrates in schematic form a transmission with a bearing position, by means of which a pump impeller is rotatably mounted on a housing.

FIG. 1 shows in a highly simplified schematic form a transmission 7 with a bearing position 1 for rotatably mounting a pump impeller 2 on a housing 4. The pump impeller 2 of a torque converter 5 is connected to a converter neck 3. The converter neck 3 is mounted in the housing 4 by means of least one roller bearing 6 in such a way that said converter neck can rotate about the axis of rotation 8 of the pump impeller 2. The housing 4, is for example, a housing 4 of a primary pump (not shown in detail), by means of which the torque converter 5 and the transmission 7 are supplied with hydraulic fluid. The axis of rotation 8 of the pump impeller 2 is also the axis of rotation 8 of a turbine impeller 9, the axis of rotation of an input shaft 10 of the transmission and the axis of rotation of a stator impeller 11. The turbine impeller 9 of the torque converter 5 is connected to the transmission input shaft 10 of the transmission 7, which is connected to the torque converter 5. This input shaft of the transmission is also concentrically aligned with the axis of rotation 8. The transmission 7 is symbolized only by means of the gear wheels 12 and 13. The stator impeller 11, which is a part of the torque converter 5 and is concentric relative to the axis of rotation 8, is supported by means of a freewheel 14.

Figure 2:
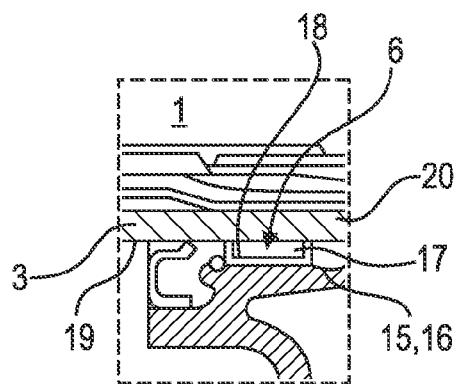
FIG. 2 illustrates a sectional view of a portion of the bearing position, according to FIG. 1, with a roller bearing for mounting a converter neck.

In a view of a portion of the bearing position 1, FIG. 2 shows in detail an arrangement of the roller bearing 6 for mounting the converter neck 3 in a housing. The roller bearing 1 comprises an outer ring 15, which is designed as an inventive sleeve 16, which is formed from sheet metal and is designed to be elastically flexible at least in subareas; as well as the rollers 17 in the form of needles. These needles are guided on an inner rolling raceway 18, which faces the axis of rotation 8, and are guided on an outer rolling raceway 19, which faces away from the axis of rotation 8. The outer rolling raceway 19 is formed directly on a surface section 20 of the converter neck 3; and the inner rolling raceway 18 is formed internally on the sleeve 16. A plurality of rollers 17, all of which have the same nominal diameter, are disposed in the ring gap 21 between the rolling raceways 18. However, only one roller 17 of the rollers 17 can be seen in the broken out sectional view. The construction of such a roller bearing 6 is shown very clearly in the drawing according to FIG. 3.

Figure 3:
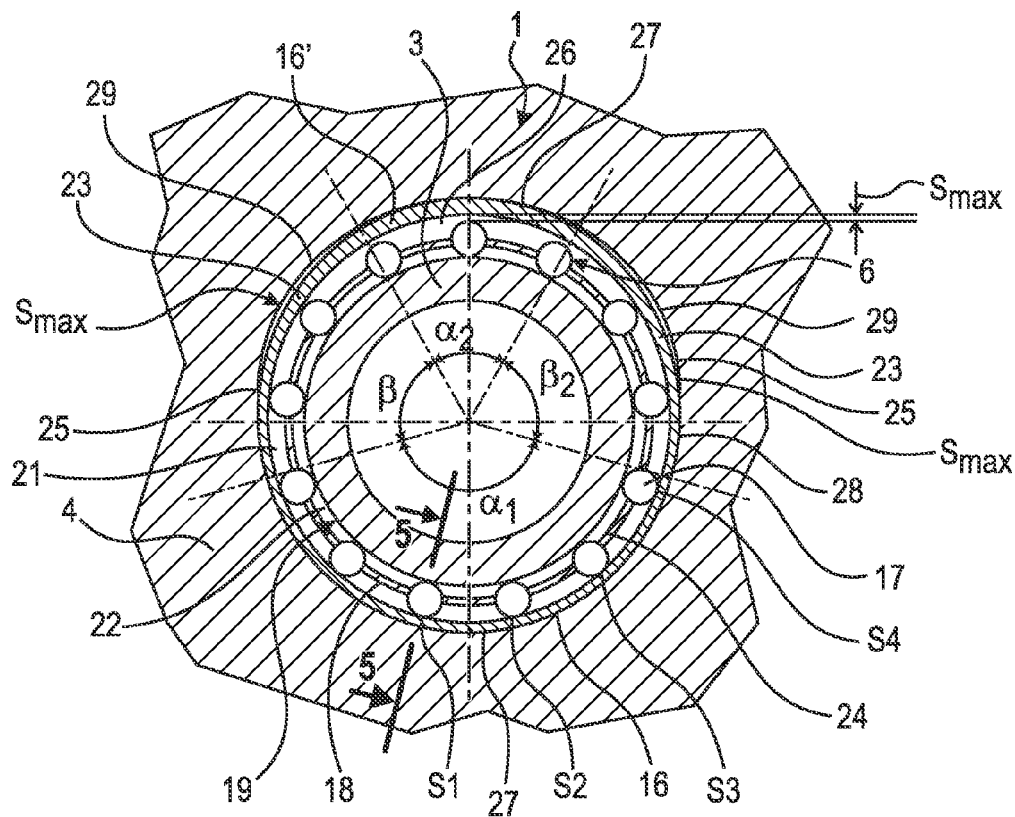
FIG. 3 illustrates a cross sectional view of the bearing position, according to FIG. 1, at right angles to the axis of rotation of the roller bearing.

FIG. 3 is an arbitrary cross sectional view of the bearing position 1 with the roller bearing 6, wherein this cross sectional view is arranged at right angles to the axis of rotation 8.

As can be seen from this drawing, the rollers 17 are arranged adjacent to each other on the periphery in a ring gap 22 radially between the inner rolling raceway 18 and the outer rolling raceway 19, which is formed on the converter neck 3, and are guided in a cage 24 in such a way that said rollers are uniformly spaced apart from each other on the periphery. The bearing position 1 has two radially elastic sections 23 of the sleeve 16 of the roller bearing 6, wherein this sleeve is provided with the inner rolling raceway 18. Each elastic section 23 is radially prestressed in an elastic manner against two rollers 17, which are supported on the outer rolling raceway 19, with a first region of the inner rolling raceway 18. When viewed in the cross section at right angles to the axis of rotation 8 of the converter neck 3, the inner rolling raceway 18 of the roller bearing 6 protrudes, at least at a first region 25 of the elastically designed section 23, further in the direction of the axis of rotation 8 than at the three remaining second regions 26 of the rolling raceway 18, these second regions being adjacent to the respective first region 25 in the circumferential direction. The outer rolling raceway 19 of the roller bearing 6 is externally cylindrical. The inner rolling raceway 18 is divided into two elastic sections 23 and two regions 27, which are adjacent to the elastic regions and are supported in each instance in the direction of the housing 4. As stated above, the respective first section 23 is elastically prestressed in the radial direction against two rollers 17 with the first region 25 and is supported on the housing 4 in the radially opposite direction by means of the second regions 27. The length of the respective second region 26 or 26' of the inner rolling raceway 18 corresponds in any arbitrary cross section to the radiant of the arc of a circle that is described by either the angle $a_1$ or $a_2$. The second regions 26 and 26' are described by a common radius, which extends from the axis of rotation 8, and are formed internally on the second sections 27 of the sleeve 16. The second sections 27 fit snugly with the side, facing away from the inner rolling raceway 18, in the internally cylindrical bore 28 of the housing 4 and, as a result, are supported in said bore. Although the first regions 25 also convexly curved, when viewed from the direction of the axis of rotation 8, said first regions have a curve shape that is either oval or flattened off relative to the first regions 25. On the rear side of the elastic section 23 and, therefore, on the side facing away from the first region 25, a gap 29 is formed with respect to the inner wall of the bore 28, as a result of which the rollers 17 are elastically prestressed and are supported in the bore 28 by means of the second sections 27. Between the inner rolling raceway 18 and the rollers 17 the radial clearances S1, S2, S3, S4 up to $S_{max}$ are in proportion to the number of rollers 17 that are not elastically prestressed, so that $S_{max}$ is the largest possible radial clearance S in the bearing position 1. At the widest point the gap 29 exhibits at least a gap dimension that is equivalent to the largest possible clearance $S_{max}$.

Figure 4:
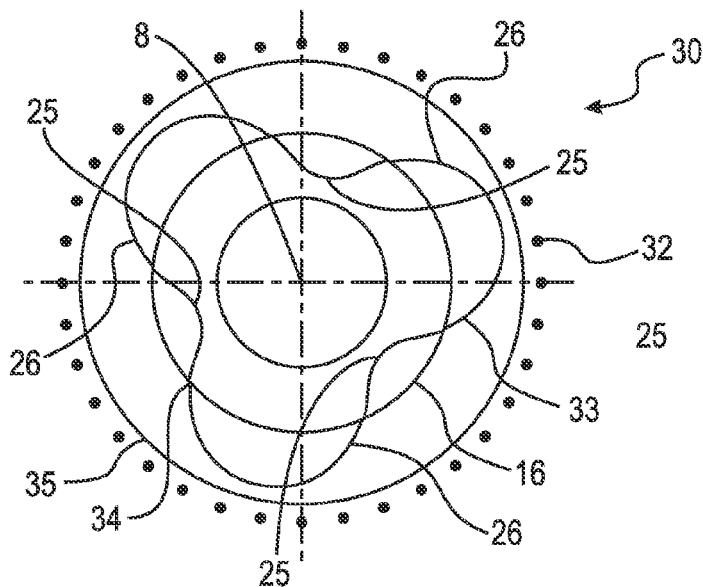
FIG. 4 is a plot of a data recorder for measuring the roundness of a sleeve of the roller bearing.

FIG. 4 shows a so-called roundness plot 30, which describes the results of the measurement of roundness of a sleeve 16 of a roller bearing. When conducting such a measurement, a measuring probe is moved over a circumferential line of the sleeve 16, which is centered on its axis of rotation 8, either on the inner diameter or on the outer diameter. At the same time the deviations from the ideal circular line are plotted. Using a scale 32 provided on the outer circumference, the full angle 360° of a circle is divided into 36×10° measuring ranges on the periphery, so that the radiant, which extends over the three first regions 25 and the three second regions 26, can be determined. The regions 25 and 26 are shown by the line 33, which describes the deviations from an ideal line 34 or 35, defining the roundness. The maximum deviation from the roundness at the respective first region 25 corresponds to the radial distance between the lines 34 and 35 and is preferably in a range between 40 and 60 µm.

Figure 5:
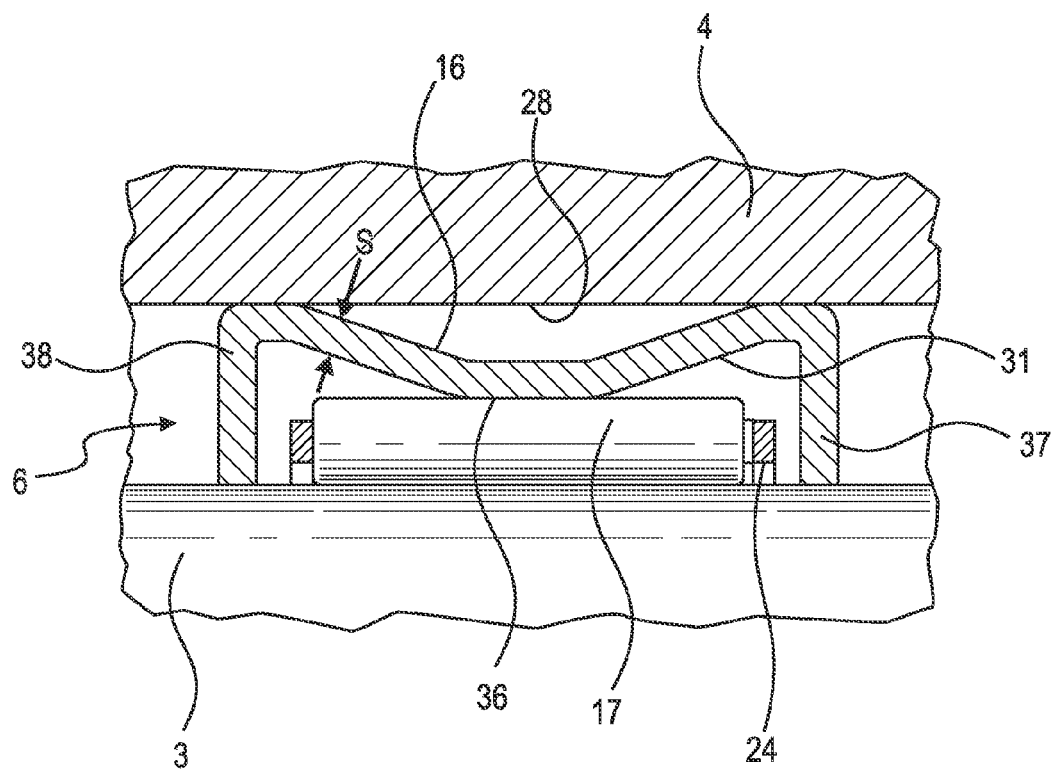
FIG. 5 illustrates a sectional view 5-5 of a detail of the roller bearing, according to FIG. 3.

FIG. 5 is a sectional view 5-5 of a detail of the roller bearing 6, according to FIG. 1, in a radially prestressed state of installation, in which a radial force acts over an outer contour on the sleeve 16, from which said radial force is then transmitted to the roller 17 by means of a convex raceway curvature 36. The convex raceway curvature 36, which is additionally introduced into the polygonally shaped contour of the sleeve 16 and which extends, starting from the lateral edges 37, 38, in the direction of the rollers 17, has the impact of improving the elasticity of the roller bearing 6. Furthermore, the elasticity can be affected by a variation or more specifically by different wall thicknesses S of the sleeve 16 in the region of the convex raceway curvature 36. As a measure to reduce the pressure per unit of area between the rollers 17 and the sleeve 16, the convex raceway curvature 36 encloses centrally a flattened off region that increases the size of a contact zone 36.

According to the plot in FIG. 6 for measuring the linearity, the convex raceway curvature 36 of the sleeve 16 shows a continuous rise, extending from the lateral edges 37, 38. A maximum curvature Y is generated in the region of a flattened zone of the convex raceway curvature 36, wherein this flattened zone forms the contact zone 36.

FIG. 7 shows a cross section of the roller bearing 6, consisting of the sleeve 16, which surrounds the cage 24 and the rollers 17, which are inserted in the cage. In order to guide the cage 24 in the axial direction, the sleeve 16 comprises laterally two opposite edges 36, 37 that face radially inwards.

FIG. 8 is a view of a detail of the roller bearing 6 according to the direction of the arrow in FIG. 7 and illustrates an end-sided profiling 39 of the edge 38 of the sleeve 16. The profiling 39, which can also be designated as a crown shape, comprises preferably round recesses, which are spaced apart at an angle α (alpha) over the entire inner periphery of the edge 38. The profiling makes it easier, for example, to receive the roller bearing 6 in a positive locking manner when the assembly of the roller bearing 6 is automated. Furthermore, it is possible to avoid faulty assembly through individual identification of the roller bearing 6 by means of the profiling 39.

LIST OF REFERENCE NUMBERS 1 bearing position
2 pump impeller
3 converter neck
4 housing
5 torque converter
6 roller bearing
7 transmission
8 axis of rotation
9 turbine impeller
10 transmission input shaft
11 stator impeller
12 gear wheel
13 gear wheel
14 freewheel
15 outer ring
16 sleeve
17 roller
18 rolling raceway inner
19 rolling raceway outer
20 surface section
21 ring gap
22 ring gap
23 section, first elastic section of the sleeve
24 cage 25 region, first region of the inner rolling raceway
26 region, second region of the inner rolling raceway
27 section, second supported section of the sleeve
28 bore, internally cylindrical bore of the housing
29 gap
30 measurement plot
31 convex raceway curvature
32 scale
33 line
34 ideal line
35 ideal line
36 contact zone
37 edge
38 edge
39 profiling

What is claimed is:

1. A torque converter, comprising:
   a housing;
   a bore arranged within the housing;
   a converter neck elastically supported on the housing;
   a pump impeller non-rotatably connected to the converter neck;
   a bearing position, comprising:
     a sleeve comprising:
       a first section having a first wall thickness, comprising:
         a first non-circular region forming a first gap with the housing;
         a second non-circular region forming a second gap with the housing; and,
         a first circular region circumferentially between the first and second non-circular regions having continuous contact with the bore; and,
       a second section having a second wall thickness, the first wall thickness being less than the second wall thickness, the second section comprising:
         a second circular region circumferentially between the first and second non-circular regions and diametrically opposed to the first circular region, the second circular region having continuous contact with the bore;
         wherein the first circular region is substantially shorter than the second circular region;
     at least one roller bearing comprising:
       an inner rolling raceway;
       an outer rolling raceway non-rotatably secured to the converter neck; and,
       at least one roller supported on the outer rolling raceway and the sleeve;
     wherein the pump impeller is rotatably mounted to the bearing position via the at least one roller bearing; and,
     an elastic convex raceway curvature enclosed via the first section of the sleeve and the inner rolling raceway;
     wherein the elastic convex raceway curvature is resiliently pre-stressed in a first radial direction against the at least one roller and supported in a second radial direction, opposite the first radial direction, against the housing.

2. The torque converter of claim 1, wherein the transversely convex raceway curvature of the sleeve is oriented in the direction of the axis of rotation.

3. The torque converter of claim 2, wherein the convex raceway curvature (31) of the sleeve has different wall thicknesses (S) as well as a flattened contact zone, which interacts with the rollers.

4. The torque converter of claim 1, wherein:
   the convex raceway curvature is polygon-shaped; and,
   in an installed state of the roller bearing, a raceway linearity ≥0.01 mm and a deviation from roundness ≥0.02 mm is generated for the convex raceway curvature of the sleeve.

5. The torque converter of claim 1, wherein, when viewed in the cross sections at right angles to the axis of rotation of the converter neck, the inner rolling raceway of the roller bearing has a third circular region.

6. The torque converter of claim 1, wherein at least one portion of the first and second circular regions rests internally directly against the housing in the radial direction, that the sleeve and the housing are radially spaced apart from each other on the side of the first circular region adjacent to the first gap, wherein the first circular region is supported on the housing at least by means of the rest of the circular regions that are directly adjacent to the first circular region.

7. The torque converter of claim 1, wherein at least one portion of the first and second circular regions rests internally directly against the housing in the radial direction, that the sleeve and the housing are radially spaced apart from each other on the side of the first circular region adjacent to the first gap, wherein the first circular region is supported on the housing at least by means of the rest of the circular regions that are directly adjacent to the first circular region, and that the sleeve and the housing are spaced apart from each other by at least a first amount, which is equal to or greater than a second amount, by which the inner rolling raceway at the first circular region protrudes radially further than the inner rolling raceway at the second circular regions.

8. The torque converter of claim 1, wherein, when viewed in the cross sections at right angles to the axis of rotation of the converter neck, the inner rolling raceway of the roller bearing protrudes, at least at the first circular region of the elastic section, further in the direction of the axis of rotation than in the rest of the second circular region, which are adjacent to the first circular region in the circumferential direction, wherein at least one portion of the inner rolling raceway of all second circular region is described by a common radius, extending from the axis of rotation.

9. The torque converter of claim 1, wherein the sleeve is made of sheet metal and has a circular cylindrical cross section and an inner circumferential surface that deviates from the shape of the circular cylinder at least at the first non-circular region.

10. A method of manufacturing a roller bearing for a bearing position, comprising the following steps:
   manufacturing a sleeve with a solid edge by forming a sheet metal strip by means of a drawing process;
   flanging the sleeve and subsequently profiling or perforating at least one edge;
   inserting the sleeve into a die for forming;
     a first non-circular region which forms a first gap with the housing;
     a second non-circular region which forms a second gap with the housing;
     a first circular region circumferentially between the first and second non-circular regions having a circular outer surface; and,
     a second circular region circumferentially between the first and second non-circular regions, opposite the first circular region, having a circular outer surface, wherein the first circular region is substantially shorter than the second circular region;

heat treating of the sleeve;

assembling the components, such as a cage and the rollers or more specifically the rolling elements, in the sleeve, in order to complete the roller bearing;

pressing in and fixing the roller bearing in a receiving bore of a housing, in order to form a bearing position; and, inserting into and fixing a converter neck in the bearing position.

11. A torque converter, comprising:

a housing;

a bore arranged within the housing;

a sleeve arranged within the bore, the sleeve comprising:
- a first non-circular region forming a first gap with the housing;
- a second non-circular region forming a second gap with the housing;
- a first circular region adjacent to the first and second non-circular regions having continuous contact with the bore; and,
- a second circular region adjacent to the first and second non-circular regions, opposite the first circular region, having continuous contact with the bore;
- wherein the first circular region is substantially shorter than the second circular region;

an outer rolling raceway;

an inner rolling raceway concentrically arranged within the sleeve, the inner raceway comprising:
- a first region, the length of the first region corresponding to the radiant of a first arc;
- a second region, the length of the second region corresponding to the radiant of a second arc;
- wherein the first arc is larger than the second arc;
- a first elastic section forming a first gap with the sleeve; and,
- a second elastic section forming a second gap with the sleeve,
- wherein the first and second regions are adjacent to the first and second elastic sections; and, at least one roller arranged between the outer rolling raceway and the inner rolling raceway.

* * * * *